Dec. 6, 1966     J. J. R. PATRICK     3,289,322

CRYSTAL STRUCTURE DISPLAY AND METHOD

Filed June 8, 1965

INVENTOR.
JOHN J. R. PATRICK
BY
HIS ATTORNEYS

United States Patent Office 3,289,322
Patented Dec. 6, 1966

3,289,322
CRYSTAL STRUCTURE DISPLAY AND METHOD
John J. R. Patrick, 1161 Solano Ave., Albany, Calif.
Filed June 8, 1965, Ser. No. 462,208
1 Claim. (Cl. 35—18)

This invention relates to a crystal structure display device and to a method for assembling such a device. More particularly, the invention relates to a crystal structure display and method of assembling which graphically illustrates within the device the axes of the specific crystalline structure depicted.

Many grade school, high school, college and post college courses are presently utilizing visual educational aids to help and assist the students to better understand the contents of the classroom teaching. Although some courses naturally do not lend themselves to the use of visual educational aids, the current trend in educational circles is to use visual educational aids whenever it is practical. One such field of visual educational aid application is in the related areas of geometry, descriptive engineering drawing and geology, and the like. In these courses it is often advantageous to have a crystal-shaped model better to understand the complicated and technical principles and theories involved.

One of the most difficult aspects of the study of crystalline structures, and the like, involves the concept of axes within the crystalline structure. From a mere drawing or sketch on a plane surface, it is difficult to visualize a straight line, real or imaginary, passing through the crystal body. Any lengthwise central line, real or imaginary, around which parts of a crystal body are symmetrically arranged can be thought of as an axis. To further complicate the concept, an axis is sometimes thought of as an imaginary line assumed in describing the position of the planes by which the crystal is bounded. Thus, any visual educational aid which readily shows the axes within a crystalline structure in a simple manner is a very welcome teaching technique.

It is, therefore, the principal object of this invention to provide a crystal structure display device which will visually illustrate the axes of the structure.

Another object of this invention is to employ a method to easily, quickly and accurately assemble the crystal structure display with the axis lines therein.

A further object is to provide a crystal structure display and method which will hold up under average, rough classroom handling.

Other features, objects and advantages of the present invention will be apparent from the following description of the preferred embodiments illustrated in the accompanying drawing in which.

In accordance with the present invention, a plurality of plane surfaced elements are assembled together to form an enclosed, hollow structure. Small apertures are in various positions about the structure and a filament member runs between oppositely-disposed apertures to illustrate the axes of the structure. The crystal structure display device is assembled in a manner so that the filaments remain in taut position after the apertures have been sealed.

Figure 1:
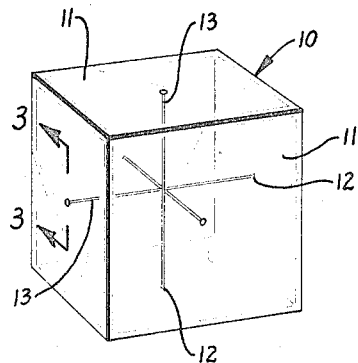
FIGURE 1 is a perspective or isometric view of a crystal structure display device shaped in accordance with a preferred mode of carrying out the instant invention and illustrating the axes within the structure.
Figure 2:
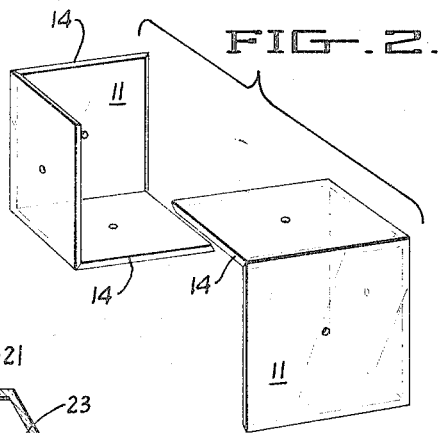
FIGURE 2 is isometric FIGURE 1, without the axes, extended to show a method of assembling together the individual plane surfaced elements.

Referring particularly to FIGURES 1 and 2, a crystal structure display device, generally designated 10, is illustrated which is intended for use as a visual educational aid in class room and related teaching. The crystal structure display device, generally indicated 10, is provided with a plurality of plane surfaced elements 11 having a plurality of oppositely-disposed apertures 12. Filament members 13 extend between oppositely-disposed apertures 12. The plane surfaced elements 11 have bevelled edges 14 for ease of assembly and are constructed of a rigid, structurally secure transparent material such as plastic or the like to insure extended classroom usage.

The crystal structure display device shown in FIGURES 1 and 2 is a cube, that is, it is formed of six equal square sides or plane surfaced elements 11. It is also a member of the cubic or isometric system which is characterized by three equal axes or filament members 13 at right angles to one another. In addition, the cube is of the holohedral form in that all of the faces or sides are symmetrical. As will be described later, many other forms, systems and shapes of crystal structure may be produced by the present invention.

Figure 3:
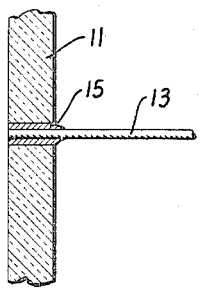
FIGURE 3 is a fragmentary enlarged view taken substantially as indicated on line 3—3 in FIGURE 1, illustrating the manner of attachment of a filament to a plane surfaced element.

The crystal structure display devices with the axes illustrated therein may be manufactured on a mass production basis, if desired. The first step is to assemble together a plurality of plane surfaced members 11 to form an enclosed structure or container. This may be done by assembling the individual elements together, or as shown in FIGURE 2, assembling two three-section elements together, using a suitable adhesive such as glue or epoxy, or the like, the bevelled edges 14 making for a snug and sealable fit of the members. The filament members 13 are then threaded into one oppositely-disposed aperture and out the other oppositely-disposed aperture with the help of a long needle or similar instrument. The filament may be thread, wires, or twine, or the like, and may also be dyed different colors, if desired. The filament member is held tight, while glue 15 (FIGURE 3), or the like, is inserted into the aperture 12 and around the filament member 13. After the adhesive has dried or set, the filament members 13 are cut on the outside of the crystal structure display device so that the end of the filament member is substantially flush with the outer surface of the plane surfaced member 11. In this manner, all of the necessary filament members may be properly positioned within the crystal structure display device. However, extreme care must be taken in the assembly procedure so that the filament members 13 remain taut while and after the adhesive has hardened.

The crystal structure display device of the present invention can be manufactured in a variety of sizes, shapes and forms, totalling over 200 variations in all. As an example, crystal structures can be made showing a block shape, a pyramid shape, a prism shape, etc. The axes system within the crystal structure may be cubic, as shown in FIGURE 1, tetragonal, hexagonal, orthorhombic, monoclinic or triclinic, to name just a few. The form or symmetry of the axes may be either holohedral or hemihedral, that is, having half of the similar parts of a crystal form.

Figure 5:
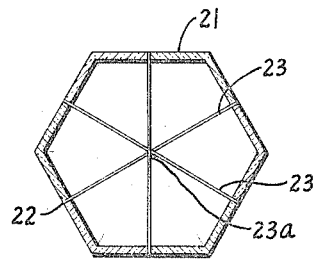
FIGURE 5 is a cross-section view taken substantially as indicated on line 5—5 in FIGURE 4.
Figure 4:
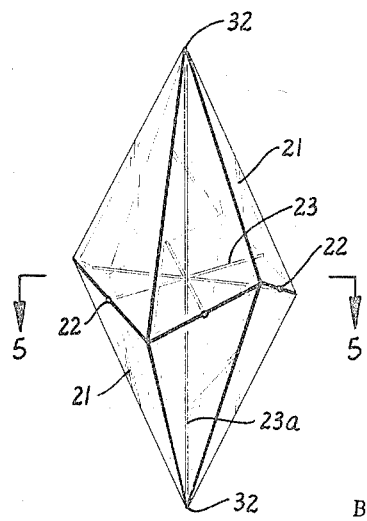
FIGURE 4 is a perspective or isometric view of a rhombohedral scalenohedron crystal shape constructed in accordance with the instant invention illustrating a plurality of axes within the structure.

A complicated crystal model, the rhombohedral scalenohedran, is illustrated in FIGURES 4 and 5. This hemihedral form is made up of twelve faces resembling a double six-sided pyramid. As shown in FIGURE 4, each plane surfaced element 21 is in the shape of a scalene triangle, that is, a triangle having the sides and angles unequal. The apertures 22 for the lateral axes are located where adjoining plane surfaced elements 21 abut, while the aperture 32 for the vertical axes are at the top and bottom of the structure. The filament members 23 are placed in position in the same manner as described above with respect to FIGURE 1. However, as shown in FIGURE 5, the filament member 23A representing the vertical axis is positioned adjacent to the intersection of all of the lateral filament members 23.

The foregoing detailed description has been given for clearness of understanding only and no unnecessary limitations should be understood therefrom for some modification will be obvious to those skilled in the art.

I claim:

A crystal structure display device comprising (a) a plurality of scalene shaped transparent plane surfaced elements, each of said elements having a plurality of notches therein;

(b) said plurality of scalene shaped elements being permanently joined together to form a crystal shape having the notches on adjacent members in cooperating relation to form an aperture;

(c) said crystal shape having pairs of oppositely disposed apertures in the middle and extremities thereof;

(d) a plurality of intersecting filaments passing through the oppositely disposed apertures in said crystal shape, the ends of said filaments being held in said apertures.

References Cited by the Examiner

FOREIGN PATENTS

| | | |
|---|---|---|
| 1,152,813 | 9/1957 | France. |
| 15,808 | 1896 | Great Britain. |
| 102,781 | 12/1916 | Great Britain. |
| 556,775 | 2/1957 | Italy. |

EUGENE R. CAPOZIO, *Primary Examiner.*

H. S. SKOGQUIST, *Assistant Examiner.*